United States Patent [19]

Eising

[11] 3,776,456

[45] Dec. 4, 1973

[54] DIRECT FIRED WATER HEATER THERMAL COMPENSATING DIP TUBE

[75] Inventor: John P. Eising, Oconomowoc, Wis.

[73] Assignee: A. O. Smith Corporation, Milwaukee, Wis.

[22] Filed: Apr. 21, 1972

[21] Appl. No.: 246,218

Related U.S. Application Data

[63] Continuation-in-part of Ser. No. 161,555, July 12, 1971, abandoned.

[52] U.S. Cl. .................... 236/93, 236/102, 126/362
[51] Int. Cl. .............................................. F24f 1/00
[58] Field of Search .......................... 126/350, 362; 236/93, 102

[56] References Cited
UNITED STATES PATENTS

| 3,285,241 | 11/1966 | Bordeaux | 126/362 |
| 2,792,180 | 5/1957 | Flagg | 236/102 |
| 2,872,120 | 2/1959 | Weiland | 236/102 X |

Primary Examiner—William E. Wayner
Attorney—Andrus, Sceales et al.

[57] ABSTRACT

A dip tube used as a conduit of cold water into a direct fired water heater is made of two concentric tubes with one tube having a higher coefficient of expansion than the other. Longitudinally spaced apertures are provided in the upper portion of the tubes which are offset under predetermined low temperature conditions. The apertures of one tube are placed in registry with the apertures of the other tube upon increase in the temperature of the water stored in the tank which expands one tube longitudinally with respect to the other to discharge the incoming cold water into the tank through the apertures at various levels within the upper portion of the tank. In another embodiment, the dip tube, formed of two concentric tubes with one having a greater coefficient of expansion, is connected to a fitting which converts the pressure head of the incoming cold water to a velocity head. When the open end of the inner concentric tube is drawn off its seat on the nozzle by longitudinal expansion of the outer concentric tube due to a rise in temperature of the stored water, this exposes the open end of the inner tube and hot water in the tank to the zone of lesser static pressure created by the incoming cold water and hot water is drawn from the upper portion of the tank through apertures in the outer concentric tube and enters the exposed end of the inner tube for discharge into the bottom portion of the water heater. Both embodiments provide for space between the concentric tubes for confining water from inside the water heater between the tubes to provide a time lag to control the rate of response of the tubes proportionally to the incoming cold water and the water in the heater so that the apertures will not be opened or closed too rapidly.

6 Claims, 6 Drawing Figures

PATENTED DEC 4 1973

3,776,456 the apertures at various levels throughout the upper portion of the water heater. When the tubes are cooled by incoming cold water they contract with the outer tube which has, in this case, the highest coefficient of expansion sensing the decrease in temperature and contracting the most and the apertures in the tubes are offset and the incoming cold water is then directed to the bottom of the tank.

DIRECT FIRED WATER HEATER THERMAL COMPENSATING DIP TUBE

BACKGROUND OF THE INVENTION

This application is a continuation-in-part of application Ser. No. 161,555 filed July 12, 1971, now abandoned.

One of the problems in the storage of hot water in water heater tanks is that the water stratifies in layers with the hottest water being located at the top of the water heater tank. Because this water upon intermittent draw-off may reach boiling temperatures and is the water drawn first from the heater tank, there is danger of injury in the draw-off of such high temperature water. The cold water in a water heater normally is discharged into the bottom portion of the tank by a dip tube suspended from the upper head of the tank of the water heater.

Previous efforts involving dip tube constructions for mixing cold water with the hot water, or drawing off the hot water in the upper portion of the tank to the lower portion, are illustrated by U.S. Pats. like Merino No. 3,251,346, Bordeaux No. 3,285,241 and Conner No. 2,592,863.

The present invention provides a dip tube of two concentric tubes with one tube having a greater coefficient of expansion than the other to register apertures or passageways in the upper portion of the respective tubes upon the greater expansion of one tube upon a rise in the temperature of the water stored in the water heater tank with respect to the other tube to discharge incoming cold water from the dip tube at various levels throughout the upper portion of the water heater.

SUMMARY OF THE INVENTION

It is common practice to suspend a dip tube from the upper head of a water heater tank which extends downwardly to the lower portion of the heater and serves as a conduit for inlet of cold water. Furthermore, it is known that the heated water stacks in the heater tank upon intermittent withdrawal of water so that there may be water at the top of the tank which is heated to a scalding temperature.

The stacking problem is overcome by the invention wherein the dip tube is formed of two concentric tubes with one tube being of a material which has a greater coefficient of expansion than the other. Either the inner tube or the outer tube may have the greater coefficient of expansion. Successful operation of the invention has been carried out, for example, by providing an inner tube of stainless steel and an outer tube of a plastic material such as polypropylene. The inner steel tube may be secured at its upper end to a fitting which is threaded into the upper head of a water heater tank and the outer polypropylene tube is slid over the stainless steel tube and is spaced from the fitting and free at the upper end. The inner steel tube at its lower end is secured to the outer tube by screws or the like and the outer tube at its lower end extends beyond the inner tube. The inner tube, however, could extend beyond the outer tube. Each of the concentric tubes is provided at their upper portions with longitudinally spaced apertures or passageways which are offset under predetermined low temperature conditions of the water in the water heater such as 60° F. When the temperature of the water in the heater tank rises, the outer tube senses the rise of temperature and expands upwardly or telescopes over the inner tube to place the corresponding apertures in the concentric tubes in registry whereby incoming cold water is discharged through the apertures at various levels throughout the upper portion of the water heater. When the tubes are cooled by incoming cold water they contract with the outer tube which has, in this case, the highest coefficient of expansion sensing the decrease in temperature and contracting the most and the apertures in the tubes are offset and the incoming cold water is then directed to the bottom of the tank.

Under another embodiment of the invention, the fitting to which the dip tube is secured is provided with a venturi passage therethrough to increase the velocity of the incoming cold water discharged into the dip tube. With this type of construction, successful operation of the invention has been carried out with a dip tube made of two concentric tubes in which the outer tube may again be of a material having a higher coefficient of expansion than the inner tube. The outer tube is secured to the outside of the fitting and the respective tubes are secured together at the lower end by a closure means and the upper free end of the inner tube normally seats against the inner face of the fitting. The outer tube at the upper portion adjacent the face of the fitting is provided with circumferentially spaced apertures. The rise of the temperature of the water in the tank effects expansion of the outer concentric tube downwardly and the inner tube is thereby unseated from the fitting and the upper end of the passage therethrough is exposed. Inlet cold water jetted from the fitting into the inner concentric tube sucks or aspirates hot water in the tank into the inner concentric tube through the apertures or passageways in the outer tube and the hot water flows through the upper exposed end of the inner concentric tube and is discharged into the bottom portion of the water heater tank.

Under both embodiments of the invention the expansion and contraction of the tubes is controlled to obtain the desired discharge of cold water into the upper part of the water heater before cut off. The control is obtained by providing openings in the outer tube permitting filling of an annular space between the tubes below the incoming water discharge openings with water from the tank to effect a delay in the heat transfer between the concentric tubes so that the tube with the highest coefficient of expansion does not expand or contract too quickly.

DESCRIPTION OF THE DRAWING

Referring to the drawings, FIg. 1 illustrates a water heater 1 having a hot water outlet 2 at the top and a fitting or nipple 3 also at the top for connection to a cold water supply and from which is suspended the dip tube 4 for discharge of incoming cold water into the water heater 1.

As illustrated in FIGS. 2–4, the dip tube 4 is formed of two concentric tubes consisting of the inner tube 5 and the outer tube 6. The inner tube 5 may be of a material having a coefficient of expansion, such as stainless steel, lower than that of the outer tube 6 which may be provided from plastic material such as polypropylene, high density polyethylene, or polysulfone. It is important that materials be selected for each tube which have a considerable difference in their coefficients of expansion. The tube with the greatest coefficient of expansion acts as a sensing element of the temperature of the water of substantially the total volume of water in the water heater because it extends from the top to near the bottom of the heater, and also as a sensing element of temperature of the incoming cold water in the dip tube. The combination of stainless steel and plastic material has the advantage that plastic may have as much as ten times greater coefficient of expansion than the steel. The invention also contemplates that the tubes may be reversed so that the inner tube 5 would be of material having a higher coefficient of expansion than the outer tube 6.

As illustrated in FIG. 2, the inner tube 5 extends beyond the outer tube 6 at the upper end and at the lower end the outer tube 6 extends beyond the inner tube 5. The upper end of the inner tube is secured to fitting 3 such as by a press fit by insertion of sleeve 7 between the upper end of inner tube 5 and the inside of the wall of fitting 3. At the lower end, the respective inner and outer tubes 5 and 6 are shown as secured together by a plurality of screws 8 which provide a tight fit of the tubes at that area. Other connection means can also be employed.

Figure 1:
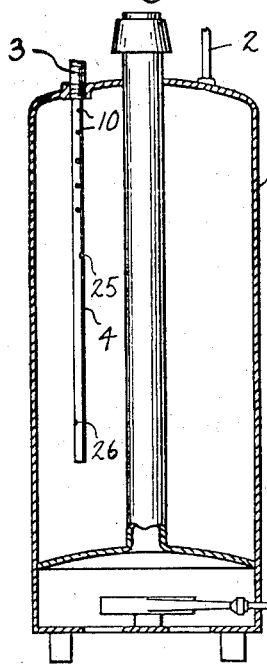
FIG. 1 is a vertical section of a water heater embodying the dip tube construction of the present invention.

At the lower end, the outer tube 6 is provided with the openings 9 for discharge of water into the lower portion of water heater 1. The upper end of the outer tube 6 is free and is spaced from fitting 3. The outer tube 6 is also of a slightly greater diameter with respect to inner tube 5 so that it can freely move over inner tube 6 because of its greater expansion characteristics when subjected to hot water.

Figure 2:
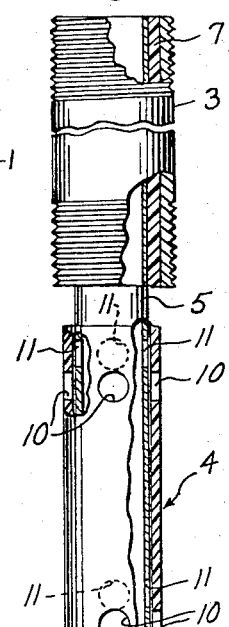
FIG. 2 is an elevational view of the dip tube of the invention with parts broken away and sectioned with the holes or apertures of the concentric tubes of the dip tube offset for discharge of cold water only into the bottom of the tank.

The outer tube 6 is provided with the circumferentially and longitudinally spaced apertures or holes 10 which, under a predetermined low temperature condition, are offset from corresponding holes or apertures 11 in the tube 5. The holes in both tubes 5 and 6 are in the upper portions of the dip tube such as, for example, within 6 to 8 inches from the top of the water heater tank. For example, with the water at a temperature of 60° F., the holes 10 and 11 would be offset, as illustrated in FIG. 2, and water entering dip tube 4 would flow to the lower end of the tube 4 and be discharged through openings 9.

Figure 3:
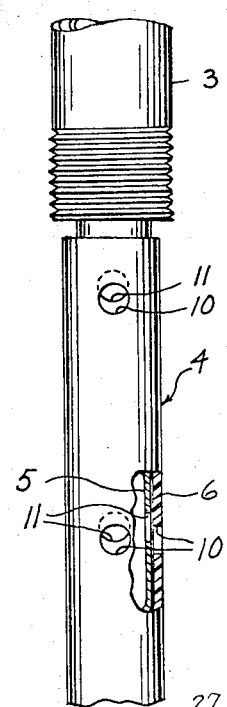
FIG. 3 is a view of a portion of the dip tube of FIG. 2 illustrating the apertures of the pair of concentric tubes substantially in registry for discharge of incoming cold water at various levels in the upper portion of the water heater and also the annular space between the concentric tubes below the discharge holes for receiving the water in the water heater.

However, with increase in temperature in the water stored in water heater 1 such as to boiling temperature at the upper portion of heater 1, the outer tube 6, having the greater coefficieint of expansion, expands upwardly on inner tube 5 to register holes 10 and 11 of the respective tubes 5 and 6 as shown in FIG. 3. This results in incoming cold water being discharged from dip tube 4 at various levels in the upper portion of water heater 1 to lower the temperature of the water in the upper portion of the heater. The amount of cold water discharged from tube 4 will depend on whether the holes 10 and 11 are closed due to the position of the tubes 5 and 6 relative to each other, and whether the holes 10 and 11 are in partial or complete registry. When holes 10 and 11 of tubes 5 and 6 are offset and not in registry a minimal amount of incoming cold water leaks into the tank through holes 10 and 11. This leakage is desirable in that it effects an increase in the amount of water which can be drawn off above a predetermined temperature, such as 120° F.

As an example of the efficiency of the dip tube discharge at various levels in the upper portion of the water heater, when a dip tube 4 having a length of 40 inches and formed of an inner stainless steel tube 5 and an outer tube 6 of polypropylene was subjected to water with a temperature rise in the water of 100° F., the movement of the outer tube 6 over inner tube 5 was 0.175 inches. The rate of response of the thermal compensating dip tube is regulated by providing the longitudinal annular space 24 between tubes 5 and 6 which is exposed to the water in the tank by the upper hole 25 and lower hole 26 in the outer tube 6. The space 24 is therefore filled with water from inside the heater and the water in annular space 24 controls the rate of heat transfer between the tubes. This provides for a controlled thermal lag or predetermined time delay in transmitting the effect of cold water in the inner tube to the outer tube and the effect of the hot water in the storage tank to the inner tube. The control of the thermal lag is determined by the amount of space between the tubes which is filled with water. Good results have been obtained with a clearance between the tubes of from 0.030 to 0.060 inches. Space 24 may be provided by having the upper portion of the inner tube 5 of greater diameter than the lower portion such as by securing a sleeve 27 on the upper portion of inner tube 5. Space 24 is closed at the lower end by sleeve 28.

Figure 4:
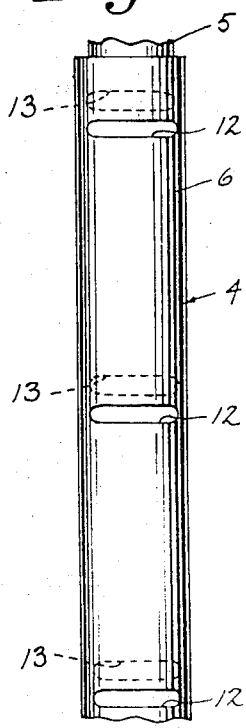
FIG. 4 is an elevational view of a portion of a dip tube wherein the apertures illustrated are slots which are shown in offset position.

In FIG. 4, the longitudinally spaced apertures are illustrated as slots 12 in the outer tube 6 and slots 13 in the inner tube 5. The slots 12 and 13 are shown as offset as they would be under cold water conditions but, under increase in temperature of the water in the tank expansion of one of the tubes relative to the other concentric tube, registers slots 12 and 13 for discharge of incoming cold water at different levels within the upper portion of the water heater 1.

Figure 5:
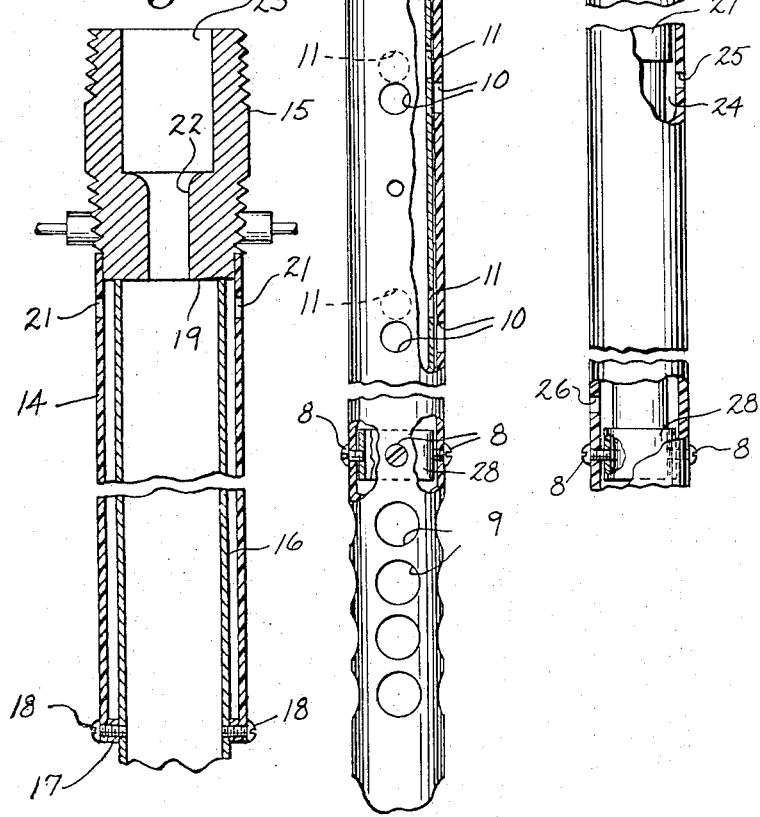
FIG. 5 is a vertical section of a dip tube which illustrates another embodiment of the invention with the inner tube seated on the inner face of the fitting.
Figure 6:
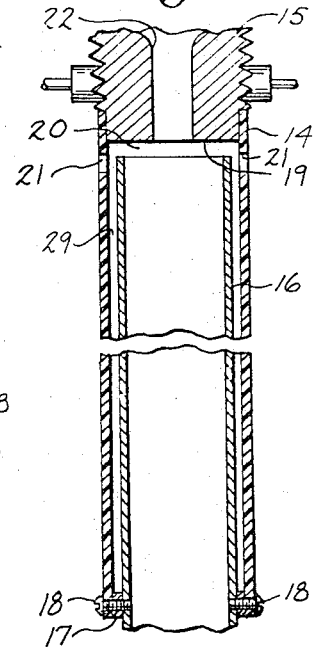
FIG. 6 is a view similar to FIG. 5, but illustrating the inner tube as unseated from the inner face of the fitting so that hot water in the upper portion of a water heate tank can flow into the dip tube for discharge at the bottom of the water heater tank.

FIGS. 5 and 6 illustrate another embodiment of the invention wherein the difference in the coefficient of expansion between two tubes making up a dip tube is utilized to draw hot water from the upper portion of water heater 1 and discharge it in the lower portion of the water heater.

In this embodiment, the upper end of the outer concentric tube 14 is suitably secured to the outer surface of fitting or nipple 15 in turn threaded into water heater 1, and the lower end of tube 14 is secured to the lower end portion of the inner concentric tube 16 by an annular sleeve 17 which is secured to tubes 14 and 16 by screws 18 and closes off the space between the tubes at the lower end. The spacing shown is somewhat exaggerated. The inner tube in the embodiment is shown with the inner tube 16 extending beyond the outer tube 14 with openings therein for discharge of cold water in the bottom of the water heater. The outer tube 14 is of a material having a higher coefficient of expansion than the material of inner tube 16. Therefore, as in the first embodiment, the inner tube 16 may be of stainless steel and the outer tube 14 may be of a plastic material such as polypropylene.

Under predetermined lower temperature of the water stored in water heater 1, such as 60° F., the inner tube 16 will rest on the inner face 19 of fitting 15 as illustrated in FIG. 5. However, upon increase in temperature in the water surrounding the dip tube, because outer tube 14 has a higher coefficient of expansion than inner tube 16, it expands downwardly to draw the inner tube 16 off from its seat on face 19 of fitting 15. This exposes the upper end or passageway in the inner tube to suction chamber 20 between the concentric tubes which opens to the plurality of apertures or passageways 21 provided in circumferentially spaced relation around the upper portion of outer concentric tube 14.

The fitting or nipple 15 is constructed so that the inner discharge passageway 22 is of a lesser diameter than the entrance passageway 23. Thus, when water passes through the fitting 15, the pressure head of the water is converted in passageway 22 to a velocity head, and the water in chamber 20 is entrained by the jet stream emerging from fitting 15. Hot water in the top of water heater 1 will then be drawn into chamber 20 through apertures 21 when tube 16 is drawn off its seat on face 19 of fitting 15 and discharged into inner concentric tube 16 and thence into the bottom portion of water heater 1. Upon cooling of the water surrounding outer tube 14, the outer tube will contract causing the inner tube 16 to move toward face 19 of nipple 15 which will then restrict or cut off the flow of hot water from the water heater 1 into tube 16 to be mixed with the incoming colder water.

The transmission of the effect of the hot and cold water between the tubes as in the first embodiment is controlled by the water in the heater filling the annular space 29 between tubes 14 and 16 so that the tube having the greater coefficient of expansion will not react to close or open passageways 21 too quickly.

Although the outer tube 14 has been described as having the highest coefficient of expansion, the construction of the concentric tubes could be reversed so that the inner tube is of a material having the highest coefficient of expansion.

The invention provides a simple way to overcome the stacking problem in water heaters by employing a dip tube of concentric members having passageways therein which register to discharge cold water into the water heater along the length of the dip tube or to draw off hot water from the upper portion of the water heater and discharge it adjacent the bottom of the water heater. Because the concentric tubes extend for practically the full tank length, they sense the variation of temperature and provide an integrated response proportional to the amount and temperature of the stored water. This is desirable because the stacking problem is a cumulative effect. The overall proportional response of the dip tube will enable the water heater to provide the maximum hot water within the desired temperature limits.

Various modes of carrying out the invention are contemplated as being within the scope of the following claims which particularly point out and distinctly claim the subject matter which is regarded as the invention.

I claim:

1. In a direct fired water heater, a thermal compensating dip tube comprising a pair of tubes secured together in concentric relation with one tube having a greater coefficient of expansion than the other and free to expand and contract longitudinally with respect to the other tube, at least one of said tubes being connected to the top of the heater for receiving the incoming water and the dip tube extending downwardly through the water stored in said heater to dispose the discharge end of the dip tube in the lower portion of the heater for normal discharge of incoming cold water into the lower portion of the heater, the tube having the greater coefficient of expansion acting as a sensing element of the temperature of substantially the total volume of water confined in the heater as well as of the incoming water in the dip tube, apertures provided in longitudinally spaced relation in the upper portion of each tube with the apertures in one tube offset longitudinally with respect to the apertures of the other tube under predetermined low temperature conditions and the corresponding apertures of the respective tubes being placed in registry with each other upon the greater expansion of the tube with the highest coefficient of expansion with respect to the other tube when the tubes are exposed to higher temperature water to adapt the dip tube to discharge incoming cold water into the tank through said apertures into the upper portion of the tank, and an annular longitudinal space provided between the tubes and exposed to the water in the heater to receive the same and thereby control the rate of the heat transfer between the tubes and delay the response of the relative expansion and contraction of the tubes for a predetermined time to the overall temperature difference between the water in the heater and the incoming water flowing in the dip tube so that the apertures will not open and close too rapidly.

2. The structure of claim 1 and longitudinally spaced openings in the outer tube to said annular space to expose the space to the water disposed inside the heater, and the space being of a size to receive water stored in the tank.

3. The structure of claim 1, in which the inner tube is of stainless steel and the outer tube is of polypropylene.

4. The structure of claim 1, wherein means are provided to secure the tubes together at the lower portions with one tube extending beyond the other tube for discharge of incoming water into the bottom of the heater with which the dip tube is assembled, and the inner tube extends above the outer tube and is disposed to be connected to the upper head of said heater, and the outer tube is disposed to be spaced from the upper head of the heater and free to expand upwardly on the inner concentric tube.

5. The structure of claim 1, and a fitting provided as a part of the dip tube adapted to secure the dip tube within a tank for storing water, and means securing one of the concentric tubes to the fitting with the other tube being free of the fitting but secured to the tube connected to the fitting adjacent the bottom portion of the latter tube.

6. The structure of claim 1 wherein the annular space provides a clearance between said tubes of from 0.030 to 0.060 inches.

* * * * *